UNITED STATES PATENT OFFICE.

THOMAS ARMSTRONG, OF HAMILTON, CANADA.

IMPROVEMENT IN HOOF-SPREADERS.

Specification forming part of Letters Patent No. 136,689, dated March 11, 1873; reissue No. 6,364, dated April 6, 1875; application filed December 14, 1874.

*To all whom it may concern:*

Be it known that I, THOMAS ARMSTRONG, of the city of Hamilton, in the county of Wentworth, in the Province of Ontario, Canada, have invented certain new and useful Improvements in Hoof-Spreaders; and I do hereby declare that the following is a full, clear, and exact description thereof, that will enable others skilled in the art to which it appertains to make and use the same, reference being had to the accompanying drawings and to the letters of reference marked thereon, which form a part of this specification.

The object of this invention is to overcome the difficulties experienced in the use of those instruments formerly used for the purpose of restoring and curing what is known as the contracted foot in horses, and to furnish for the use of veterinary surgeons and others a more complete instrument for treatment of contracted hoof in horses by treating the hoof before the shoe is entirely nailed on, adjusting the shell or horny substance of the hoof to the exact shape and dimensions desired, and then fastening the shoe by complete nailing, thus permanently securing such shape and dimensions, and thereby accomplishing a better result.

In the accompanying drawing the same letters of reference indicate the same parts.

Figure 1 is a view of the under side or sole of a horse's foot, and is marked A. It is shown, in this view, with a shoe, which is marked S. The shoe is supposed to be transparent in order to show the principal parts under it, which it may be necessary to refer to in the description, *a a a* being the horny crust of the foot; *b b*, the bars; *c c*, the heels; *i i*, the bulbs of the heels. The spreader B is shown in this view attached directly under the shoe, and pressing against the heel on each side and spreading the hoof.

Fig. 2 is also a view of the same parts of the foot as Fig. 1, with the spreader B in this case attached obliquely on the foot, one of the ends bearing on the heel, and the other end considerably farther in toward the bar *b*, in which position it may be frequently required to be used. This view shows the adaptability of the spreader B to be used in every necessary position. It will be observed that, in this oblique position, one side is being spread out without, at the same time, spreading the other side to the same extent.

Fig. 3 is still another view of the same part of the horse's foot, showing the spreader B attached in a reverse position, which may be frequently required. It is shown in this view to be spreading both sides equally—same in Fig. 1.

Fig. 4 is an edge view of the spreader B.

The implement consists of two levers, *b′ b′*, joined by a middle bar, *c′*, with variable centers, for the enlargement or contraction of the instrument; a tightening-screw, *d;* a spiral spring, *e;* (this spiral spring may either be used or not—in some cases it may be better without it;) *f*, a grooved washer, with guides to keep the grooves in position for the corresponding grooves on curved ends of levers *b′ b′*. *g* is a nut, with handle for operating the screw *d*. *h h* are two thumb-screws, which are used as centers for the levers *b′ b′*. The instrument is made nearly all of cast-steel.

My invention relates to that class of implements which are made use of for expanding the hoofs of horses to any desired shape and dimension that may be necessary to a proper treatment thereof; and the nature thereof consists, primarily, in so combining a pair of levers with a movable fulcrum-bar and a tightening-rod that the pressure may be brought to bear upon that part of the hoof at which it is desired to direct it. It also consists in so combining the various operative parts of which the implement is composed as to allow of its being applied from any side of the hoof, and in such a manner as to be at all times convenient to the hand of the operator.

It is to be noted that the curvilinear ends of the levers *b′ b′* are provided with longitudinal apertures, through which passes the rod *d*, which may be adjusted at variable angles with the said levers, and in such a manner as to cause the power to be unequally applied upon the same.

Having thus explained my invention, I claim—

1. The means provided for adjusting the direction of the levers, consisting of the curvilinear ends, provided with longitudinal apertures, the spring, and the tightening-rod, all combined as described.

2. The combination and arrangement of the levers $b'$ $b'$, middle bar $c'$, tightening-screw $d$, spiral spring $e$, grooved washer $f$, hand-nut $g$, and thumb-screws $h$ $h$, as described, and for the purposes set forth.

In testimony that I claim the foregoing I have hereunto set my hand.

THOS. ARMSTRONG.

Witnesses:
CHARLES WALTER,
O. KIMMELL.